United States Patent
Goulette et al.

(10) Patent No.: US 7,644,578 B2
(45) Date of Patent: Jan. 12, 2010

(54) VEHICLE EXHAUST AFTERTREATMENT SYSTEM

(75) Inventors: David A. Goulette, Marine City, MI (US); Joseph V. Bonadies, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 595 days.

(21) Appl. No.: 11/268,304

(22) Filed: Nov. 7, 2005

(65) Prior Publication Data

US 2007/0101704 A1    May 10, 2007

(51) Int. Cl.
*F01N 3/00* (2006.01)

(52) U.S. Cl. ............................. 60/286; 60/295; 60/297; 60/303; 60/311

(58) Field of Classification Search .................. 60/285, 60/286, 295, 297, 303, 311; 422/169, 171, 422/172, 177, 182
See application file for complete search history.

(56) References Cited

U.S. PATENT DOCUMENTS

| | | | |
|---|---|---|---|
| 5,746,989 A | 5/1998 | Murachi et al. | |
| 5,811,364 A * | 9/1998 | Suga et al. | 502/328 |
| 5,884,473 A * | 3/1999 | Noda et al. | 60/274 |
| 6,164,065 A * | 12/2000 | Denari et al. | 60/284 |
| 6,235,255 B1 | 5/2001 | Kharas | |
| 6,539,709 B2 * | 4/2003 | Kubo et al. | 60/301 |
| 6,560,958 B1 * | 5/2003 | Bromberg et al. | 60/275 |
| 6,655,130 B1 | 12/2003 | Kirwan et al. | |
| 6,832,473 B2 | 12/2004 | Kupe et al. | |
| 6,938,412 B2 * | 9/2005 | Li et al. | 60/300 |
| 2004/0098977 A1 * | 5/2004 | Kupe et al. | 60/286 |
| 2004/0112046 A1 | 6/2004 | Tumati et al. | |
| 2004/0146458 A1 | 7/2004 | Weissman et al. | |
| 2004/0244365 A1 * | 12/2004 | Asanuma et al. | 60/285 |
| 2005/0022450 A1 | 2/2005 | Tan et al. | |

FOREIGN PATENT DOCUMENTS

| | | | |
|---|---|---|---|
| JP | 06117221 A | * | 4/1994 |
| WO | 02/18753 | | 3/2002 |
| WO | 2004/030798 | | 4/2004 |

OTHER PUBLICATIONS

European Search Report dated Feb. 14, 2007.

* cited by examiner

*Primary Examiner*—Tu M Nguyen
(74) *Attorney, Agent, or Firm*—Thomas N. Twomey

(57) ABSTRACT

A vehicle exhaust aftertreatment system for controlling emissions from an engine includes, in serial order: an exhaust outlet from the engine, an exhaust catalyst assembly that is in fluid communication with the exhaust outlet and includes a first $NO_x$ component coupled with a downstream oxidation catalyst, and a second $NO_x$ adsorber that is downstream from and in fluid communication with the oxidation catalyst of the exhaust catalyst assembly.

19 Claims, 2 Drawing Sheets

VEHICLE EXHAUST AFTERTREATMENT SYSTEM

TECHNICAL FIELD

The present invention relates to a vehicle exhaust aftertreatment system, more particularly, to an aftertreatment system architecture for reducing cold start emissions.

BACKGROUND OF THE INVENTION

Internal combustion engines operate by the controlled combustion of hydrocarbon fuels and produce exhaust gases containing complete combustion products such as carbon dioxide ($CO_2$) and water ($H_2O$), and incomplete combustion products such as carbon monoxide (CO) and unburned hydrocarbons (HC). Further, as a result of the very high temperatures produced by the burning of the hydrocarbon fuels, thermal fixation of nitrogen in the air results in the detrimental formation of nitrogen oxide compounds ($NO_x$). Certain undesirable components of the exhaust, including hydrocarbons, soot particulates, CO, and $NO_x$, must be controlled to meet government emissions regulations.

The quantities of pollutants generated by incomplete combustion varies with operating conditions of the engine but are influenced predominantly by the air-to-fuel ratio in the combustion cylinder. Conditions conducive to reducing carbon monoxide and unburned hydrocarbons, i.e., a fuel mixture just lean of stoichiometric and high combustion temperatures, cause an increased formation of $NO_x$, and conditions conducive to reducing the formation of $NO_x$, i.e., rich fuel mixture and low combustion temperatures, cause an increase in carbon monoxide and unburned hydrocarbons in the exhaust gases. As a result, within the region of stable operation of the internal combustion engine, significant amounts of CO, HC and $NO_x$ are emitted from the engine.

It is obviously desirable to reduce the emissions of a warmed up engine operating at high flow steady state conditions. However it is also very important to reduce the cold start emissions of the engine, which can be achieved by employing a fast light-off exhaust catalyst. When the vehicle is started, the catalyst can be heated to light-off temperature, using, for example, exhaust heating, injection of reformate, and heating of reformate using an in-exhaust burner.

Reformates are hydrogen-enriched fuels that can be produced from a variety of sources, including gasoline, diesel, and other liquid or gaseous fuels. On-board reformers for producing hydrogen-enriched reformate fuels are described in, for example, U.S. Pat. Nos. 6,655,130 and 6,832,473 and U.S. Patent Appl. Publ. Nos. 2004/0146458 and 2005/0022450, the disclosures of which are incorporated herein by reference.

The vehicle exhaust aftertreatment system of the present invention, which is particularly suitable for use with a diesel engine, includes an exhaust catalyst that comprises a small volume $NO_x$ adsorber coupled with a small volume oxidation catalyst. This configuration of the exhaust catalyst enables it to be quickly heated to the temperature where $NO_x$ storage begins to occur, typically above 150° C., and then to light-off temperature, where the catalyst is able to convert the stored $NO_x$ to $N_2$. This rapid storage and light-off also allows the amount of included precious metal to be reduced.

SUMMARY OF THE INVENTION

The present invention is directed to a vehicle exhaust aftertreatment system for controlling emissions from an engine. The system comprises, in serial order: an exhaust outlet from the engine, an exhaust catalyst assembly that is in fluid communication with the exhaust outlet and comprises a first $NO_x$ adsorber coupled with a downstream oxidation catalyst, and a second $NO_x$ adsorber that is downstream from and in fluid communication with the oxidation catalyst of the exhaust catalyst assembly.

The arrows in FIGS. 1-6 indicate the direction of gas flow in the exhaust aftertreatment system of the present invention.

DESCRIPTION OF THE PREFERRED EMBODIMENTS

Figure 1:
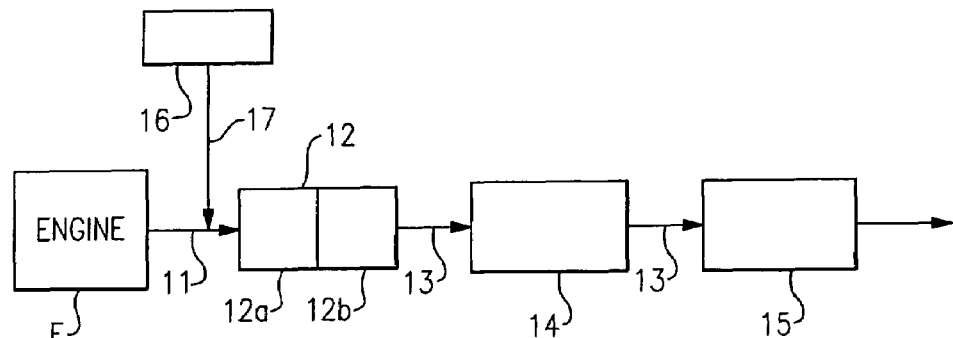
FIG. 1 is a schematic depiction of a vehicle exhaust aftertreatment system in accordance with the present invention.

Referring to FIG. 1, a first embodiment 10 of the invention includes an exhaust outlet 11 connected to an exhaust catalyst assembly 12 comprising a first $NO_x$ component 12a coupled with a downstream oxidation catalyst 12b. An exhaust conduit 13 connects oxidation catalyst 12b with a second $NO_x$ adsorber 14, which preferably is an underfloor adsorber. System 10 preferably further includes a particulate filter 15 connected to second $NO_x$ adsorber 14 by exhaust conduit 13. The volume of particulate filter 15 preferably is greater than that of second $NO_x$ adsorber 14.

Exhaust catalyst assembly 12, whose volume preferably is smaller than that of second $NO_x$ adsorber 14, can be rapidly brought to operating temperature by means of a heat source 16, preferably reformate fuel produced by an on-board reformer. The reformate fuel can be supplied to catalyst assembly 12 via a reformer conduit 17 connected to exhaust outlet 11.

The volume of exhaust catalyst assembly 12 preferably is about 1.5 liters to about 3 liters, each of first $NO_x$ adsorber 12a and oxidation catalyst having a volume preferably of about 0.75 liter to about 1.5 liters. The volume of second $NO_x$ adsorber 14 preferably is about 5 liters to about 8 liters, and the volume of particulate filter 15 preferably is about 8 liters to about 13 liters.

Figure 2:
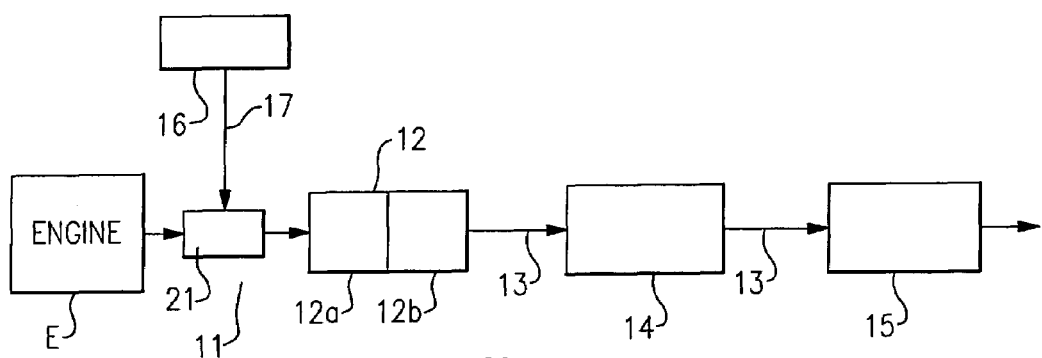
FIG. 2 is a schematic depiction of a vehicle exhaust aftertreatment system in accordance with a second embodiment of the invention.

Referring to FIG. 2, a second embodiment 20 of the invention is similar to that of system 10 schematically depicted in FIG. 1, except that a burner 21 is included in exhaust outlet 11 upstream of exhaust catalyst assembly 12 to increase the temperature of the reformate fuel delivered from heat source 16 and to oxidize any HC and CO that may be present, thereby preventing passage of these gases to downstream catalysts that have not yet reached their operating temperatures.

Figure 3:
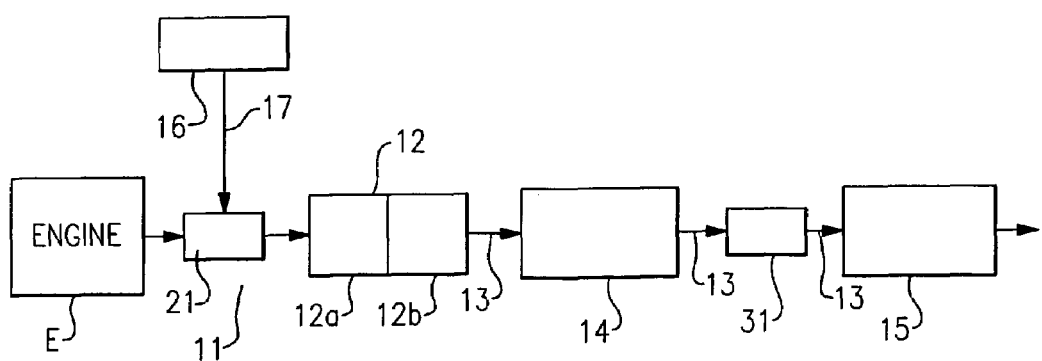
FIG. 3 is a schematic depiction of a vehicle exhaust aftertreatment system in accordance with a third embodiment of the invention.

Referring to FIG. 3, a third embodiment 30 of the invention is similar to that of system 20 schematically depicted in FIG.

2, except that a second burner 31 is installed in exhaust conduit 13 downstream from second $NO_x$ adsorber 14. Burner 31 assists in the regeneration of particulate filter 15 by promoting the combustion of particles collected on the filter surfaces.

Figure 4:
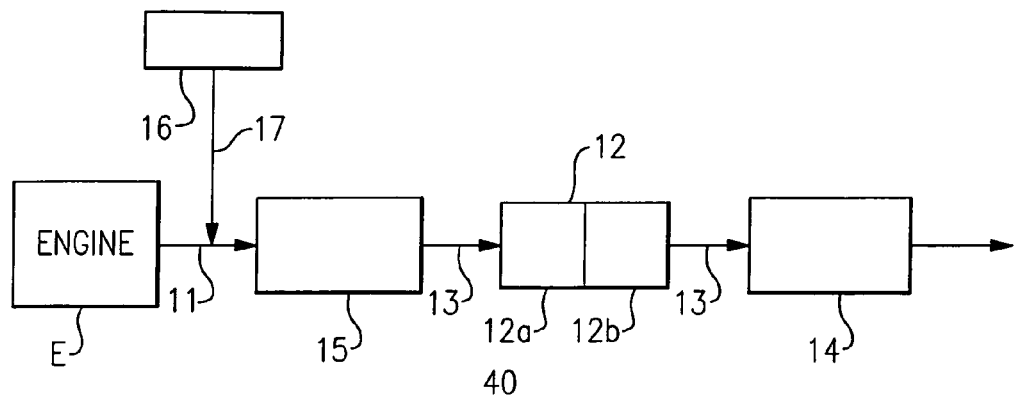
FIG. 4 is a schematic depiction of a vehicle exhaust aftertreatment system in accordance with a fourth embodiment of the invention.

Referring to FIG. 4, a fourth embodiment 40 of the invention is similar to that of system 10 schematically depicted in FIG. 1, except that particulate filter 15 is connected to exhaust outlet 11 and is disposed upstream from catalyst assembly 12 comprising first $NO_x$ component 12a coupled with downstream oxidation catalyst 12b. In system 40, similarly to system 10, exhaust conduit 13 connects oxidation catalyst 12b with second $NO_x$ adsorber 14, which preferably is an underfloor adsorber.

System 40 further preferably includes heat source 16, preferably reformate fuel produced by an on-board reformer. The reformate fuel can be supplied to exhaust outlet 11 via reformer conduit 17.

Figure 5:
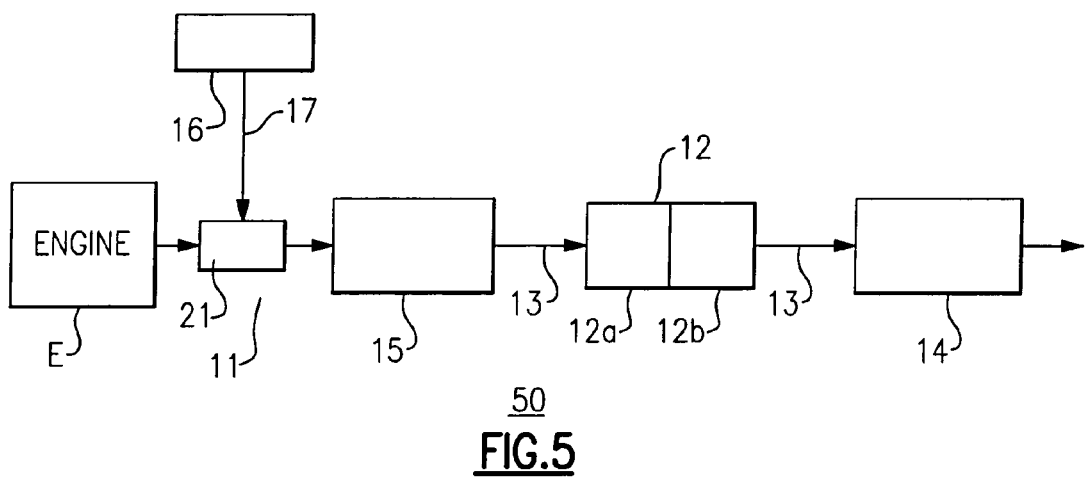
FIG. 5 is a schematic depiction of a vehicle exhaust aftertreatment system in accordance with a fifth embodiment of the invention.

Referring to FIG. 5, a fifth embodiment 50 of the invention is similar to that of system 40 schematically depicted in FIG. 4, except that a burner 21 is included in exhaust outlet 11 upstream of particulate filter 15 to increase the temperature of the reformate fuel delivered from heat source 16.

Figure 6:
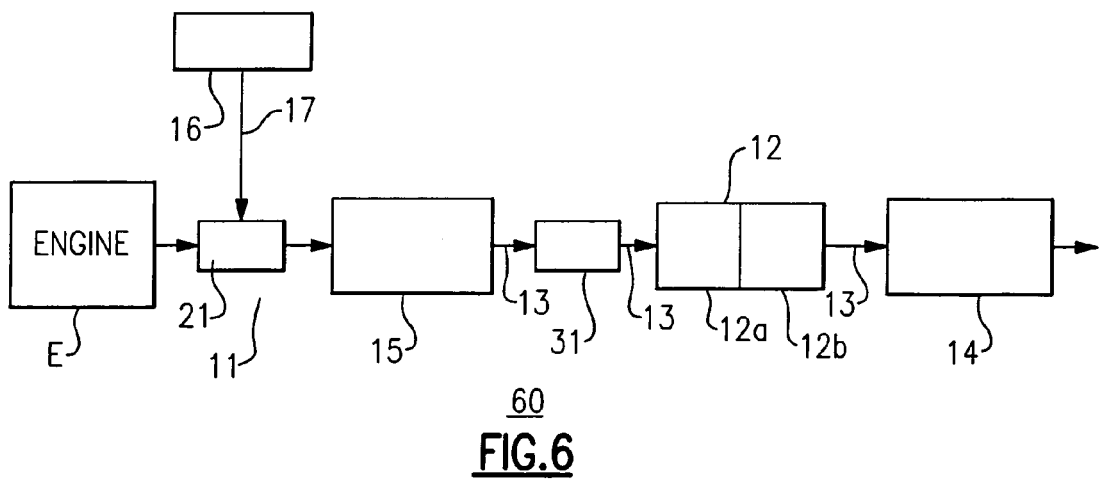
FIG. 6 is a schematic depiction of a vehicle exhaust aftertreatment system in accordance with a sixth embodiment of the invention.

Referring to FIG. 6, a sixth embodiment 60 of the invention is similar to that of system 50 schematically depicted in FIG. 5, except that a second burner 31 is installed in exhaust conduit 13 downstream from particulate filter 15 and upstream of exhaust catalyst assembly 12. Burner 31 assists in bringing catalyst assembly 12 comprising first $NO_x$ component 12a coupled with downstream oxidation catalyst 12b to its normal operating temperature.

As stated in the previously mentioned U.S. Pat. No. 6,832,473, the disclosure of which is incorporated herein by reference, the same catalytic metals can be employed in $NO_x$ adsorbers, oxidation catalysts, and particulate filters.

The $NO_x$ adsorbers 12a and 14 generally comprise a porous support, a catalytic metal component, and one or more $NO_x$ trapping materials. Suitable $NO_x$ trapping materials include alkali metals, alkaline earth metals, and the like, and combinations thereof. The catalytic metal component and $NO_x$ trapping materials can be washcoated, imbibed, impregnated, physisorbed, chemisorbed, precipitated, or otherwise applied onto and/or within the porous support.

The porous support can comprise any material designed for use in a spark ignition or diesel engine environment. Preferably, the porous support is selected to be capable of operating at temperatures up to about 1200° C. and of withstanding exposure to hydrocarbons, nitrogen oxides, carbon monoxide, carbon dioxide, sulfur and/or sulfur oxides; furthermore it must have sufficient surface area and structural integrity to support the desired catalyst. Some possible materials include zirconium toughened alumina, cordierite, silicon carbide, metallic foils, alumina sponges, porous glasses, and the like, and mixtures thereof. The porous support can have any size or geometry, the size and geometry are preferably chosen to optimize surface area in the given design parameters.

The catalytic metal components of $NO_x$ adsorbers 12a and 14 comprise precious metals such as, platinum, rhodium, palladium, ruthenium, iridium and osmium, as well as alloys and combinations thereof. Where the catalytic metal component is a combination of rhodium with one or more other metals, the other metals, e.g., palladium, platinum, and the like, are typically present in an amount less than the rhodium. In addition to the catalytic metal component, the porous support may be further loaded with one or more $NO_x$ trapping materials such as alkali metals, alkaline earth metal, and mixtures thereof. Suitable trapping materials include barium, lithium, potassium, magnesium, sodium, cesium, strontium, and combinations thereof.

The oxidation catalyst 12b preferably comprises a catalytic metal including, but not limited to, platinum, palladium, ruthenium, rhodium, osmium, iridium, gold, silver, aluminum, gallium, indium, tin, and titanium, as well as oxides, alloys, salts, and mixtures thereof. Preferably, catalyst 12b further includes a support that preferably comprises an inorganic oxide, preferably alumina, and zeolite in the proton form and having a high Si/Al ratio, as described in U.S. Pat. No. 6,235,255, the disclosure of which is incorporated herein by reference.

The particulate filter 15 generally comprises a shell, an insulation material, and a filter element. The insulation material substantially covers the filter element, and the shell substantially covers the insulation material. Suitable materials for the shell include ferrous materials such as ferritic stainless steels. The insulation material comprises materials such as fiberglass, intumescent materials, non-intumescent materials, ceramic mats, and/or mica based materials, and combinations thereof.

The porous filter element can include one or more monoliths, substrates, supports, and the like comprising, for example, ceramics, cermets, carbides, silicides, nitrides, and the like, and combinations thereof. Preferably, the filter element also includes a metal catalyst such as platinum, palladium, rhodium, nickel, iron, cobalt, molybdenum, tungsten, vanadium, niobium, tantalum, their oxides and sulfides, and combinations thereof. Further, the filter element can optionally include a washcoat material such as aluminum oxide, silicon oxide, zirconium oxide, titanium oxide, cerium oxide, and combinations thereof.

EXAMPLES

Federal Test Procedure FTP-75, which is employed to measure light duty vehicle emissions, entails an operating cycle having a duration of 1874 seconds, divided into three phases, as follows:
cold start phase (0-505 sec)
transient phase (505-1369 seconds)
hot start phase (0-505 seconds)—starts after engine has been stopped for 10 minutes The emissions from each phase are collected in a separate Teflon bag and analyzed, and the quantities of components are expressed in grams/mile (g/mi). The weighting factors are 0.43 for the cold start phase, 1.0 for the transient phase, and 0.57 for the hot start phase.

The FTP-75 test was carried out for a vehicle exhaust aftertreatment system of the present invention that includes, as depicted in FIG. 1, an exhaust catalyst assembly 12 comprising a first $NO_x$ adsorber 12a coupled with a downstream oxidation catalyst 12b, followed by a second $NO_x$ adsorber 14. The volume of exhaust catalyst assembly 12 was 2.5 liters, each of $NO_x$ component 12a and oxidation catalyst 12b having a volume of 1.25 liters. The volume of second $NO_x$ adsorber 14 was 5 liters.

For the purpose of comparison, a prior art aftertreatment system similar to that just described but with the positions of the first $NO_x$ adsorber and oxidation catalyst reversed, i.e., the first $NO_x$ adsorber is downstream from the oxidation catalyst. The volumes of the respective components are the same in the system of the invention and the comparison system.

The amounts of total hydrocarbons (THC), non-methane hydrocarbons (NMHC), carbon monoxide (CO), and nitrogen oxides ($NO_x$) for the comparison vehicle exhaust aftertreatment system and the system in accordance with the present invention, as determined by the FTP-75 emission test, are presented in the following TABLE:

TABLE

FTP-75 EMISSION TEST RESULTS

| System | THC (g/mi) | NMHC (g/mi) | CO (g/mi) | NOx (g/mi) |
|---|---|---|---|---|
| Comparison | 0.325 | 0.073 | 5.506 | 0.073 |
| Invention | 0.296 | 0.065 | 3.654 | 0.046 |
| % Reduction in Emissions | 8.9 | 11.0 | 33.6 | 37.0 |

As demonstrated by the results presented in the foregoing TABLE, the vehicle exhaust aftertreatment system of the present invention provides a substantial reduction in environment-damaging engine emissions. The benefit is especially striking in the large reductions in the amounts of emitted CO and $NO_x$.

While the invention has been described by reference to certain specific embodiments, it should be understood that numerous changes may be made within the spirit and scope of the inventive concepts described. Accordingly, it is intended that the invention not be limited to the described embodiments, but have the full scope defined by the language of the following claims.

What is claimed is:

1. A vehicle exhaust aftertreatment system for controlling emissions from an engine, said system comprising, in serial order:
    an exhaust outlet from said engine;
    an exhaust catalyst assembly in fluid communication with said exhaust outlet, said exhaust catalyst assembly comprising a first $NO_x$ adsorber coupled with a downstream oxidation catalyst; and
    a second $NO_x$ adsorber downstream and in fluid communication with said oxidation catalyst, wherein said exhaust catalyst assembly is characterized by a volume smaller than the volume of said second $NO_x$ adsorber.

2. The vehicle exhaust aftertreatment system of claim 1 wherein said second $NO_x$ adsorber comprises an underfloor $NO_x$ adsorber.

3. The vehicle exhaust aftertreatment system of claim 1 wherein said second $NO_x$ adsorber has a volume of about 5 liters to about 8 liters.

4. The vehicle exhaust aftertreatment system of claim 1 wherein said exhaust catalyst assembly has a volume of about 1.5 liters to about 3 liters.

5. The vehicle exhaust aftertreatment system of claim 4 wherein each of said first $NO_x$ adsorber and said oxidation catalyst has a volume of about 0.75 liter to about 1.5 liters.

6. The vehicle exhaust aftertreatment system of claim 1 further comprising a particulate filter in fluid communication with said second $NO_x$ adsorber.

7. The vehicle exhaust aftertreatment system of claim 6 wherein said particulate filter is characterized by a volume greater than the volume of said second $NO_x$ adsorber.

8. The vehicle exhaust aftertreatment system of claim 1 further comprising a particulate filter in fluid communication with said second $NO_x$ adsorber.

9. The vehicle exhaust aftertreatment system of claim 8 wherein said particulate filter is characterized by a volume greater than the volume of said second $NO_x$ adsorber.

10. The vehicle exhaust aftertreatment system of claim 9 wherein said particulate filter has a volume of about 8 liters to about 13 liters.

11. The vehicle exhaust aftertreatment system of claim 1 wherein said exhaust outlet further comprises a first burner upstream of said exhaust catalyst assembly.

12. The vehicle exhaust aftertreatment system of claim 11 further comprising a second burner downstream from said second $NO_x$ adsorber.

13. The vehicle exhaust aftertreatment system of claim 12 further comprising a particulate filter downstream from said second burner.

14. The vehicle exhaust aftertreatment system of claim 1 further comprising a heat source in fluid communication with said exhaust outlet of said engine.

15. The vehicle exhaust aftertreatment system of claim 14 wherein said heat source comprises reformate fuel.

16. The vehicle exhaust aftertreatment system of claim 15 wherein said reformate fuel is provided by an on-board reformer.

17. The vehicle exhaust aftertreatment system of claim 14 further comprising a particulate filter upstream from said exhaust catalyst assembly and in fluid communication with said exhaust outlet and said exhaust catalyst assembly.

18. The vehicle exhaust aftertreatment system of claim 17 wherein said exhaust outlet further comprises a first burner upstream of said particulate filter.

19. The vehicle exhaust aftertreatment system of claim 18 wherein said exhaust outlet further comprises a second burner downstream of said particulate filter and upstream of said exhaust catalyst assembly.

* * * * *